US011978984B2

(12) United States Patent
Nozawa

(10) Patent No.: US 11,978,984 B2
(45) Date of Patent: May 7, 2024

(54) SIGNAL CABLE CONNECTION DEVICE HAVING A FOLDED WIRE

(71) Applicant: SONY INTERACTIVE ENTERTAINMENT INC., Tokyo (JP)

(72) Inventor: Tetsufumi Nozawa, Chiba (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 212 days.

(21) Appl. No.: 17/421,690

(22) PCT Filed: Jan. 21, 2020

(86) PCT No.: PCT/JP2020/001909
§ 371 (c)(1),
(2) Date: Jul. 8, 2021

(87) PCT Pub. No.: WO2020/153347
PCT Pub. Date: Jul. 30, 2020

(65) Prior Publication Data

US 2022/0094115 A1 Mar. 24, 2022

(30) Foreign Application Priority Data

Jan. 21, 2019 (JP) ................................ 2019-007945

(51) Int. Cl.
*H01R 13/6593* (2011.01)
*H01R 13/6591* (2011.01)
(Continued)

(52) U.S. Cl.
CPC ..... *H01R 13/6593* (2013.01); *H01R 13/6591* (2013.01); *H01B 7/18* (2013.01);
(Continued)

(58) Field of Classification Search
CPC .. H01R 13/6593; H01R 13/6591; H01R 4/10; H01R 4/18; H01R 4/187; H01R 13/648;
(Continued)

(56) References Cited

U.S. PATENT DOCUMENTS 5,820,412 A 10/1998 Koegel et al.
7,044,756 B1 5/2006 Asakura et al.

FOREIGN PATENT DOCUMENTS

CN 1168550 A 12/1997
CN 101026268 A 8/2007
(Continued)

OTHER PUBLICATIONS

International Preliminary Report on Patentability dated Jul. 29, 2021, from PCT/JP2020/001909, 15 sheets including translation.
(Continued)

*Primary Examiner* — Abdullah A Riyami
*Assistant Examiner* — Justin M Kratt
(74) *Attorney, Agent, or Firm* — XSENSUS LLP

(57) ABSTRACT

Provided is a signal cable including a connector (20) including a shell (21) that houses a connection terminal (22) to be connected to a connection terminal included in an electronic device and that is electrically connected to a frame ground of the electronic device in a state in which the connector (20) is connected to the electronic device, a cable body (10) including a ground connection wire electrically connected to the shell (21), and a supporting member (40) having a tubular shape and having a higher rigidity than the surface of the cable body (10). The connector-side end portion of the cable body (10) is led inside the supporting member (40), the connector-side end portion of the ground connection wire includes a folded portion that folded, and is disposed outside the supporting member (40), and the shell (21) is fixed to the cable body (10) in a state in which the folded portion is
(Continued)

sandwiched between the shell (21) and the supporting member (40).

9 Claims, 4 Drawing Sheets

(51) Int. Cl.

| | |
|---|---|
| *H01B 7/18* | (2006.01) |
| *H01B 7/22* | (2006.01) |
| *H01B 11/00* | (2006.01) |
| *H01R 4/10* | (2006.01) |
| *H01R 4/18* | (2006.01) |
| *H01R 13/58* | (2006.01) |
| *H01R 13/648* | (2006.01) |
| *H01R 13/658* | (2011.01) |
| *H01R 13/6592* | (2011.01) |

(52) U.S. Cl.

CPC ................ *H01B 7/22* (2013.01); *H01B 7/228* (2013.01); *H01B 11/00* (2013.01); *H01R 4/10* (2013.01); *H01R 4/18* (2013.01); *H01R 4/187* (2013.01); *H01R 13/58* (2013.01); *H01R 13/5804* (2013.01); *H01R 13/5808* (2013.01); *H01R 13/582* (2013.01); *H01R 13/5825* (2013.01); *H01R 13/648* (2013.01); *H01R 13/658* (2013.01); *H01R 13/65912* (2020.08); *H01R 13/6592* (2013.01)

(58) Field of Classification Search

CPC .............. H01R 13/658; H01R 13/6592; H01R 13/65912; H01R 4/023; H01R 24/60; H01R 13/58; H01R 13/5804; H01R 13/5808; H01R 13/582; H01R 13/5825; H01B 7/22; H01B 7/228; H01B 11/00; H01B 7/18

See application file for complete search history.

(56) References Cited

FOREIGN PATENT DOCUMENTS

| | | | | |
|---|---|---|---|---|
| CN | 101064406 | A | | 10/2007 |
| CN | 201112598 | Y | | 9/2008 |
| CN | 104518312 | A | | 4/2015 |
| GB | 1473676 | A | | 5/1977 |
| JP | 10-108346 | A | | 4/1998 |
| JP | 10108346 | A | * | 4/1998 |
| JP | 2002-270309 | A | | 9/2002 |
| JP | 2002270309 | A | * | 9/2002 |
| JP | 2012-48818 | A | | 3/2012 |
| JP | 2012048818 | A | * | 3/2012 |

OTHER PUBLICATIONS

First Office Action dated Dec. 28, 2022, from Chinese Patent Application No. 202080009195.X, 8 sheets.

International Search Report and Written Opinion dated Mar. 24, 2020, from PCT/JP2020/001909, 9 sheets.

Microfilm of the specification and drawings annexed to the request of Japanese Utility Model Application No. 25413/1987 (Laid-open No. 133077/1988) (Shigeji Factory Inc.) Aug. 31, 1988 (Aug. 31, 1988) specification, p. 2, ine 13 to p. 5, line 15, fig. 1.

* cited by examiner

SIGNAL CABLE CONNECTION DEVICE HAVING A FOLDED WIRE

TECHNICAL FIELD

The present invention relates to a signal cable with connectors for connecting to electronic devices, and a production method therefor.

BACKGROUND ART

Generally, signal cables for transmitting/receiving signals according to various kinds of standards such as High-Definition Multimedia Interface (HDMI) (registered trademark) each include connectors for connecting to electronic devices. When a process of attaching a connector to the cable body of such a signal cable is performed, some of conductive wires such as a braided wire among conductive wires passing inside the signal cable are processed in such a way as to be electrically connected to a shell that houses connection terminals of the connector. This process enables the conductive wires connected to the shell to be electrically connected to a frame ground of an electronic device in a state in which the signal cable is connected to the electronic device.

SUMMARY

Technical Problems

In order to increase the degree of freedom of wiring of the cable body, inside conductive wires and a covering portion for covering the conductive wires are made of a material having a high flexibility. For this reason, when the process of attaching the connector to the cable body is performed, it is not easy to perform the process in such a way that the conductive wires such as the braided wire are electrically connected to the shell of the connector with certainty. Particularly, in a case where signal transmission/reception with a high-frequency clock is performed using the signal cable, an insufficient contact between the conductive wires and the shell of the connector results in a cause of the occurrence of unnecessary electromagnetic radiation.

The present invention has been made in view of the above situations, and one of objects of the present invention is to provide a signal cable that allows its conductive wire that is to be connected to a frame ground of an electronic device to be electrically connected to a shell of a connector with certainty, and a production method therefor.

Solution to Problems

A signal cable according to the present invention includes a connector to be connected to an electronic device, the connector including a shell that houses a connection terminal to be connected to a connection terminal included in the electronic device and that is electrically connected to a frame ground of the electronic device in a state in which the connector is connected to the electronic device, a cable body including a ground connection wire electrically connected to the shell, and a supporting member having a tubular shape and having a higher rigidity than a surface of the cable body. Further, an end portion of the cable body, the end portion of the cable body being at a side of the connector, is led inside the supporting member. An end portion of the ground connection wire, the end portion of the ground connection wire being at the side of the connector, includes a folded portion that is folded and disposed outside the supporting member. The shell is fixed to the cable body in a state in which the folded portion is sandwiched between the shell and the supporting member.

A production method for a signal cable, according to the present invention is a production method for a signal cable including a connector to be connected to an electronic device, the connector including a shell that houses a connection terminal to be connected to a connection terminal included in the electronic device and that is electrically connected to a frame ground of the electronic device in a state in which the connector is connected to the electronic device, a cable body including a ground connection wire electrically connected to the shell, and a supporting member having a tubular shape and having a higher rigidity than a surface of the cable body. The production method includes a step of forming a folded portion by folding an end portion of the ground connection wire to an outside of the supporting member in a state in which an end portion of the cable body, the end portion of the cable body being at a side of the connector, is led inside the supporting member, and a step of fixing the shell to the cable body by crimping a coupling portion constituting the shell and formed at a side opposite an end side of the connector in a state in which the folded portion is sandwiched between the supporting member and the coupling portion.

DESCRIPTION OF EMBODIMENT

Hereinafter, an embodiment of the present invention will be described in detail on the basis of the drawings.

Figure 1:
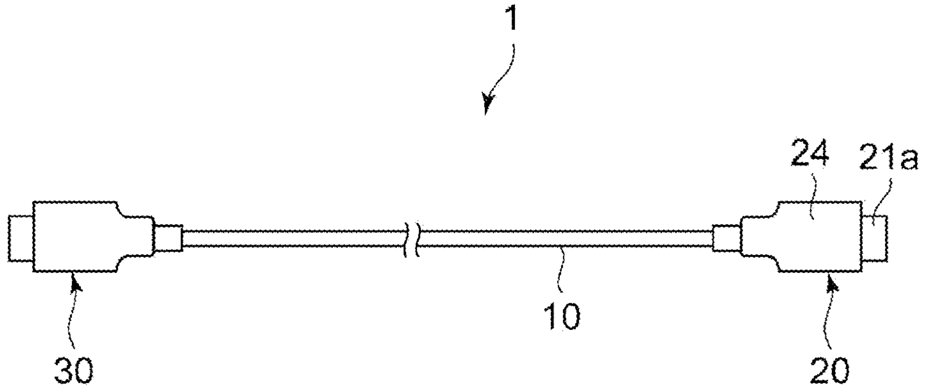
FIG. 1 is a diagram illustrating an external view of a signal cable according to an embodiment of the present invention.
Figure 2:
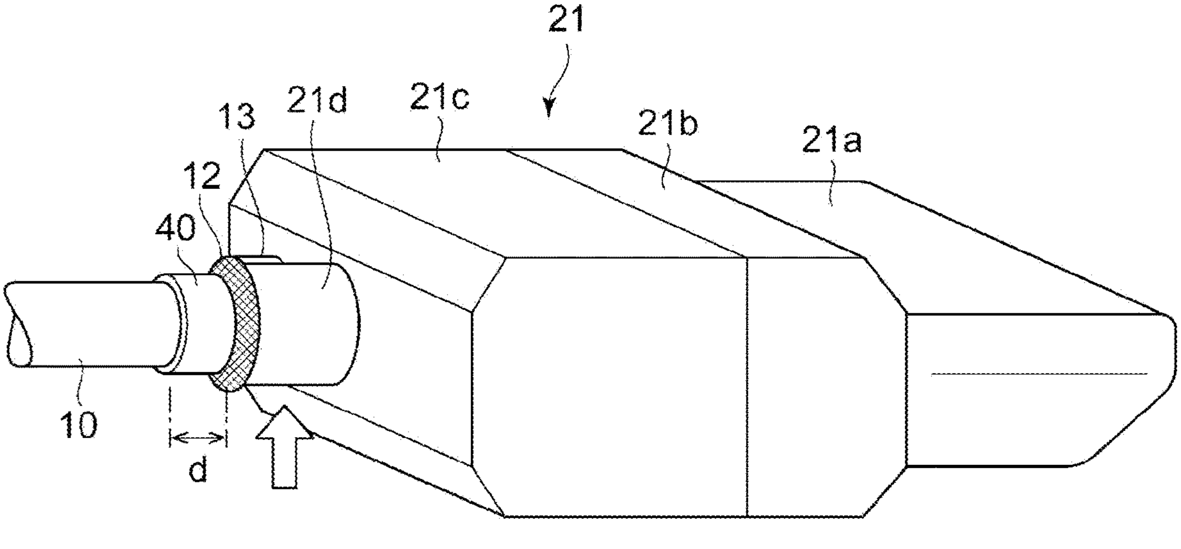
FIG. 2 is a perspective view illustrating a condition of a portion where a cable body and a connector are coupled to each other in the signal cable according to the embodiment of the present invention.
Figure 3:
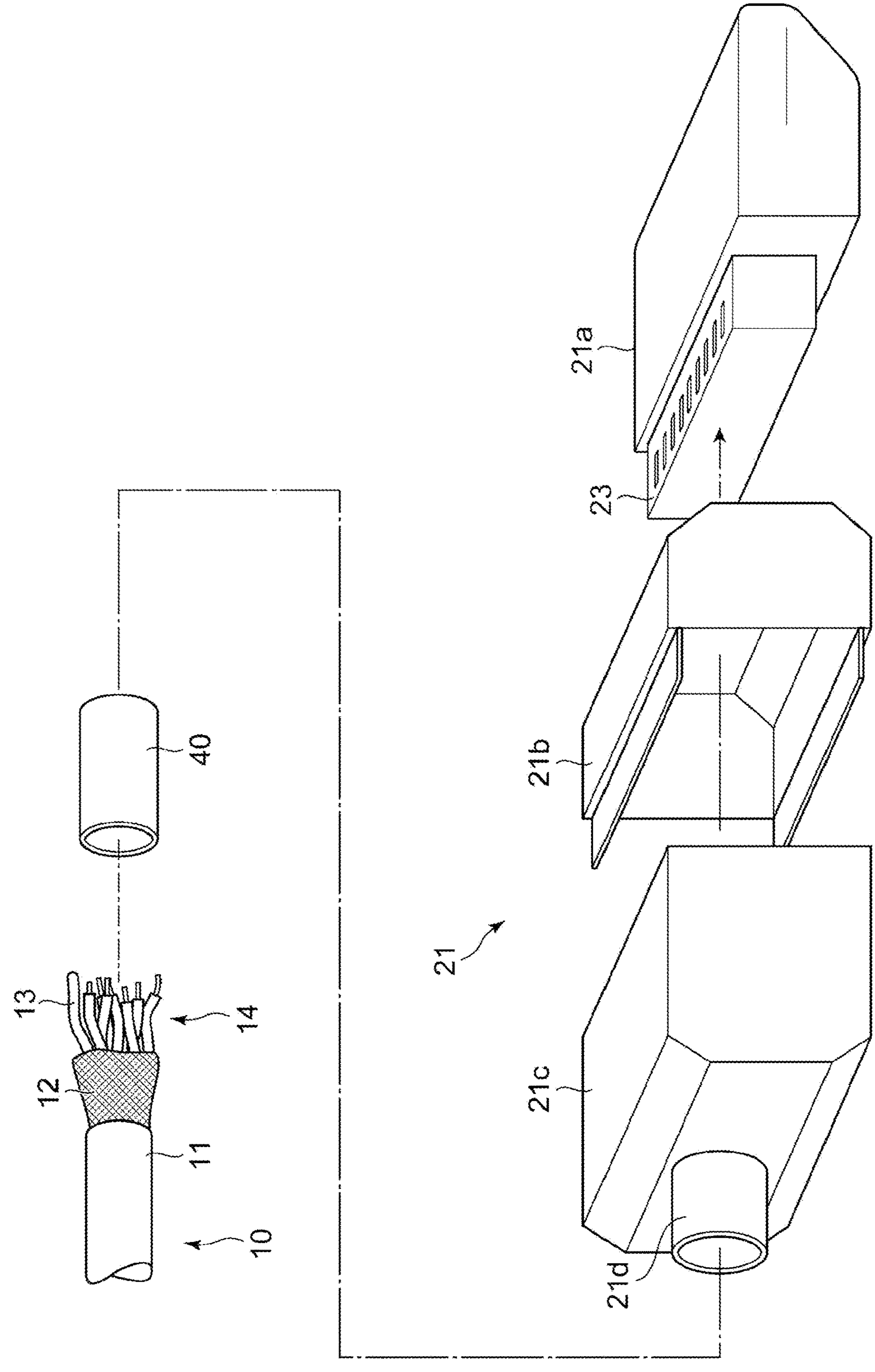
FIG. 3 is a disassembled perspective view illustrating a condition of the portion where the cable body and the connector are coupled to each other in the signal cable according to the embodiment of the present invention.
Figure 4:
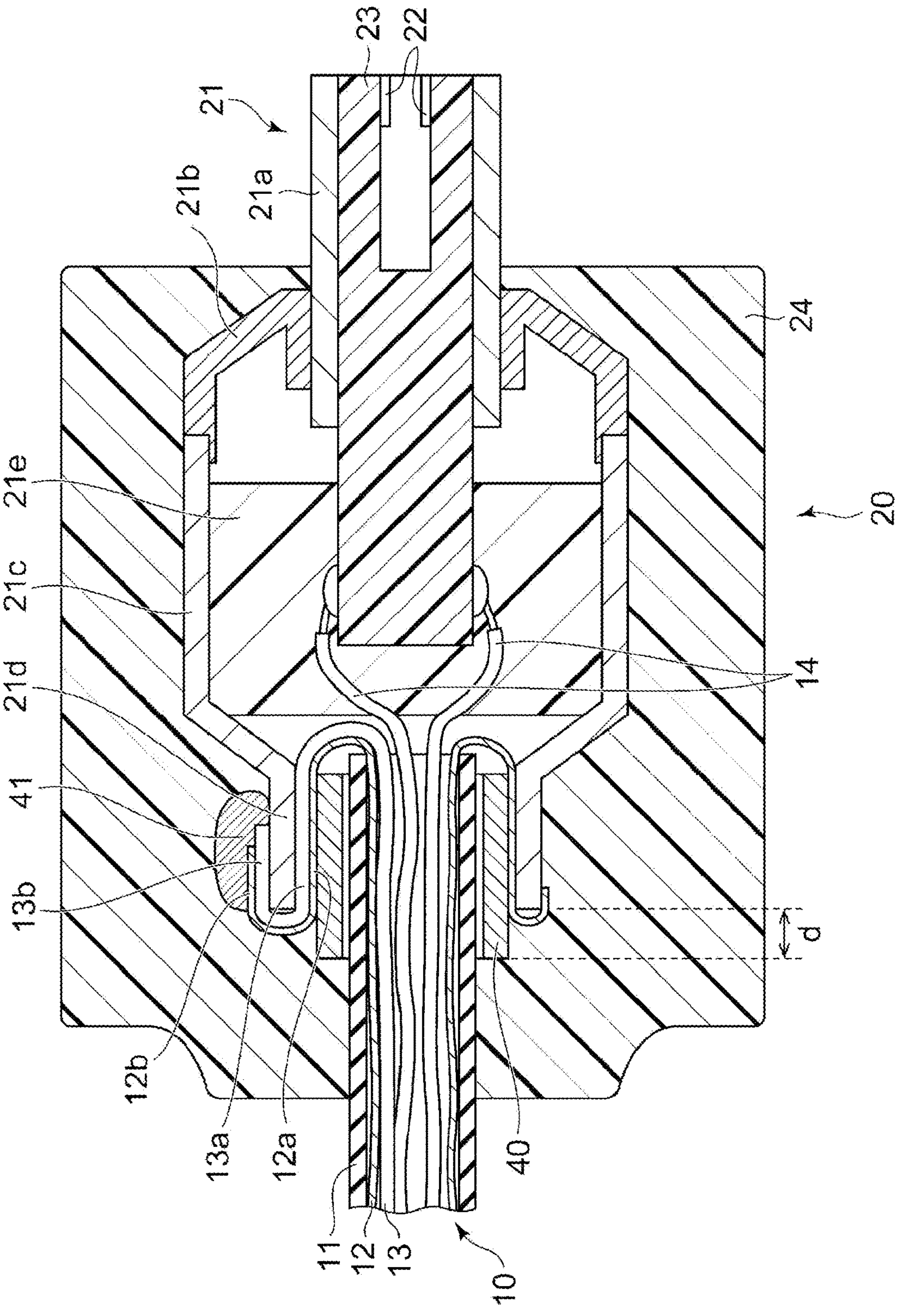
FIG. 4 is a cross-sectional view of the portion where the cable body and the connector are coupled to each other in the signal cable according to the embodiment of the present invention.

FIG. 1 is a diagram illustrating an external view of a signal cable 1 according to an embodiment of the present invention. FIG. 2 is a perspective view schematically illustrating a condition of a portion of the signal cable 1 where a cable body 10 and a connector 20 are coupled to each other and illustrates a condition of a state in which a cover 24 described later is not attached. FIG. 3 is a disassembled perspective view illustrating a state before the cable body 10 of the signal cable 1 is coupled to the connector 20. Further, FIG. 4 is a schematic cross-sectional view illustrating a condition resulting from cutting, along a cable extension direction, the portion where the cable body 10 and the connector 20 are coupled to each other.

As illustrated in these figures, the signal cable 1 includes the cable body 10, which is linear, the connector 20, which is attached to one end of the cable body 10, a connector 30 attached to the other end of the cable body 10, which is at the side opposite the connector 20 side, and a supporting member 40 disposed in the portion where the cable body 10 and the connector 20 are coupled to each other.

Hereinafter, as a specific example, a case where the signal cable 1 is an HDMI cable will be described. Further, hereinafter, a structure of the connector 20 attached to one end of the cable body 10 will be described. Note here that the connector 30 attached to the other opposite end may have a structure similar to that of the connector 20, and alternatively, the connector 30 may have a structure different from that of the connector 20.

The signal cable 1 interconnects two electronic devices and is used for the transmission/reception of signals to/from each other by these electronic devices. In the following, an electronic device to which the connector 20 is connected will be referred to as a first electronic device E1, and an electronic device to which the connector 30 is connected will be referred to as a second electronic device E2.

The cable body 10 includes a covering portion 11, a braided wire 12, a drain wire 13, and a plurality of signal wires 14. Specifically, the braided wire 12, the drain wire 13, and the plurality of signal wires 14 are led inside the cable body 10, and the covering portion 11, which is made of an insulating material, covers the outside of these wires. That is, the covering portion 11 forms the outer face of the cable body 10. In addition, any other member, such as aluminum foil, other than those having been described here may be included inside the covering portion 11.

The braided wire 12 includes a plurality of thin thread-like conductive wires knitted in a mesh structure. The braided wire 12 is formed in a tubular shape as a whole, and is disposed immediately inside the covering portion 11. The material of the conductive wires composing the braided wire 12 may be various kinds of materials such as copper and an alloy of aluminum and magnesium.

The drain wire 13 and the plurality of signal wires 14 are both led inside the braided wire 12. The drain wire 13 is a single conductive wire made of a conductive material such as an alloy of copper. Each of the plurality of signal wires 14 includes a conductive core wire passing through the center of the each of the signal wires 14 and a covering made of an insulating material and covering the surrounding area of the conductive core wire, and this conductive core wire is electrically connected to a connection terminal 22 included in the connector 20. The first electronic device E1 and the second electronic device E2 transmit/receive signals to/from each other via the plurality of signal wires 14.

In the present embodiment, the braided wire 12 and the drain wire 13 are in contact with and electrically connected to a shell 21 of the connector 20, which will be described later. With this configuration, it follows that, when the connector 20 is connected to the first electronic device E1, the braided wire 12 and the drain wire 13 are electrically connected to a frame ground of the first electronic device E1. Moreover, the braided wire 12 and the drain wire 13 extend from a connector 20 side end to an opposite side end of the cable body 10 and are electrically connected to a shell of the connector 30 at the opposite side end. Particularly, electrically connecting the drain wire 13 having a relatively low impedance to the connectors at both ends of the signal cable 1 enables achievement of a ground common to the two electronic devices connected to each other via the signal cable 1. Note that, hereinafter, wires electrically connected to the shell 21 of the connector 20 among wires being led inside the cable body 10 will be referred to as ground connection wires. In the present embodiment, the braided wire 12 and the drain wire 13 both function as the ground connection wires.

The connector 20 includes the shell 21, a plurality of the connection terminals 22, a housing 23, and the cover 24. In the present embodiment, an assumption is made that the connector 20 is a plug connector and is brought into connection with the first electronic device E1 by being inserted into a receptacle connector included in the first electronic device E1.

The shell 21 includes three members, that is, an insertion portion 21*a* that, when the connector 20 is connected to the first electronic device E1, is inserted into a connector of the first electronic device E1 and is connected to its frame ground, a front portion 21*b* for supporting the insertion portion 21*a*, and a rear portion 21*c* including a coupling portion 21*d* to be coupled to the cable body 10. These three members are each formed in an approximately tubular shape by using a material having conductivity. The insertion portion 21*a* is inserted in an opening disposed at a side of the front portion 21*b*, which is at an end side of the connector 20 (that is, a side at which the connector 20 is connected to the first electronic device E1). Further, an opening disposed at a side of the front portion 21*b*, which is at a cable-center side (that is, a side opposite the side at which the connector 20 is connected to the first electronic device E1), is fit into an opening disposed at a side of the rear portion 21*c*, which is at the end side of the connector 20. With these configurations, it follows that the shell 21 has a tubular shape in which, as a whole, its side face is seamlessly formed. Note here that, in a state in which the three members are combined, the shell 21 has openings at the connector end side and the cable-center side, but has no opening in an intermediate portion other than the connector end side opening and the coupling portion 21*d*. This configuration allows the shell 21 to function as a shield case that shields a space which is included in the shell 21 and which includes portions at which the signal wires 14 are connected to the housing 23. In addition, the connector end side opening of the insertion portion 21*a* is plugged by the housing 23 described later. Further, the coupling portion 21*d* disposed at the cable-center side shields unnecessary electromagnetic radiation occurring from the inside of the shell 21, by being crimped together with the braided wire 12, as described later.

The housing 23 made of resin is disposed inside the insertion portion 21*a*, and the plurality of connection terminals 22 is housed inside the housing 23. Each of the connection terminals 22 is electrically connected to a corresponding one of the signal wires 14 by means of soldering or the like and is electrically connected to a corresponding connection terminal disposed in the connector of the first electronic device E1 in the state in which the connector 20 is connected to the first electronic device E1. Note that, for the sake of simplification, FIG. 4 illustrates only two signal wires 14 connected to two connection terminals 22 disposed at upper and lower sides. As illustrated in FIG. 4, resin 21*e* is filled inside the rear portion 21*c*. With this configuration, the surrounding area of a cable-center side portion of the housing 23, which includes connection portions for the signal wires 14, is protected by the resin 21*e*.

The coupling portion 21*d*, which is to be coupled to the cable body 10, is disposed at the cable-center side of the rear portion 21*c*. The coupling portion 21*d* has approximately the same tubular shape as that of the cable body 10 in a cross-sectional view and has an inner diameter larger than the outer diameter of the supporting member 40, which will be described later.

The cover 24 is a member for covering portions other than the insertion portion 21*a* inside the shell 21 (that is, cable body 10 side portions including the coupling portion 21*d*). The cover 24 is made of an insulating material such as resin. For example, the cover 24 may be formed by, after the fixing of the shell 21 to the cable body 10 by means of a method described later, filling resin in the surrounding area of the shell 21.

The supporting member 40 is a member having a tubular shape and is made of a conductive material such as iron. Specifically, the supporting member 40 may be formed by using, for example, a steel plate. Further, the supporting member 40 may be formed by using a member obtained by, onto the surface of a base material, plating a different kind of metallic material. The supporting member 40 preferably has a higher rigidity than the covering portion 11 disposed on the surface of the cable body 10. Further, the supporting member 40 preferably has a rigidity the same as or higher than that of the coupling portion 21*d* of the shell 21. Note that the shape of the supporting member 40 is not particularly limited, provided that the shape is capable of enclosing the outer circumference of the cable body 10 in a cross-sectional view in a state in which the supporting member 40 is fixed to the cable body 10. For example, the supporting member 40 may have a shape in which a portion of its side face is cut off by a slit formed along the longitudinal direction. In this case, it follows that the supporting member 40 does not have a loop shape but has a C-letter shape, in a cross-sectional view.

The inner diameter of the supporting member 40 is larger than the outer diameter of the cable body 10, and an end of the cable body 10, which is at a side connected to the connector 20, is led inside the supporting member 40. An end of the braided wire 12, which is at the connector 20 side, projects from the end of the covering portion 11, and this projecting portion is folded outward to form a folded portion 12*a*. The folded portion 12*a* is disposed further outside than the outer face of the supporting member 40. Further, an end portion of the drain wire 13, which is at the connector 20 side, also projects from the end of the covering portion 11, and this projecting portion is folded to the outside of the supporting member 40 to form a folded portion 13*a*. The folded portion 13*a* of the drain wire 13 is disposed further outside than the supporting member 40 and the folded portion 12*a* of the braided wire 12.

Here, examples of a step of assembling the shell 21 and a step of coupling the shell 21 to the cable body 10, these steps being a portion of a process of producing the signal cable 1, will be described. First, end portions of the individual signal wires 14 are soldered to corresponding contact points exposed on a rear portion of the housing 23 in a state in which the end portion of the cable body 10 is led inside the supporting member 40 and inside the rear portion 21*c*. These contact points are joined to the connection terminals 22 disposed at the connector 20 end side, inside the housing 23. In this state, the individual end portions of the braided wire 12 and the drain wire 13 are folded to the outside of the supporting member 40 to form the folded portion 12*a* and the folded portion 13*a*. Here, the supporting member 40 may be fixed to the cable body 10 by means of a crimping process such as a swaging process at a stage in which the cable body 10 has been led inside the supporting member 40. In addition, in the case where, as described above, a slit is formed on the side face of the supporting member 40, performing such a swaging process on the supporting member 40 allows the supporting member 40 to have the loop shape in a cross-sectional view and enter a state of surrounding the outer circumference of the cable body 10.

Thereafter, the rear portion 21*c* of the shell 21 is fixed to the cable body 10 by means of the crimping process such as the swaging process. Specifically, a pressure is applied to the coupling portion 21*d* from the outside in a state in which the supporting member 40 and the cable body 10 are led inside the coupling portion 21*d*. This process causes the rear portion 21*c* to be fixed to the cable body 10.

A portion at which the crimping process is performed is a position at which the supporting member 40, the folded portion 12*a* of the braided wire 12, and the folded portion 13*a* of the drain wire 13 are disposed outside the covering portion 11 of the cable body 10. That is, the pressure is applied from the outside of the coupling portion 21*d* toward the center of a diameter direction of the cable body 10 in a state in which the drain wire 13 and the braided wire 12 inside the cable body 10, the covering portion 11, the supporting member 40, the folded portion 12*a* of the braided wire 12, the folded portion 13*a* of the drain wire 13, and the coupling portion 21*d* of the shell 21 are stacked in this order along a diameter direction from the center of the cable body 10 to the outside. This process allows the rear portion 21*c* to be coupled and fixed to the cable body 10. Note that a block arrow of FIG. 2 indicates a position at which the crimping process is performed.

As described above, since the supporting member 40 has a higher rigidity than the covering portion 11, it follows that, when the crimping process is performed, the folded portion 12*a* of the braided wire 12 is pressed against the inner face of the coupling portion 21*d* by a strong pressure while being supported by the supporting member 40. This process brings the folded portion 12*a* into a state of being sandwiched between the supporting member 40 and the coupling portion 21*d*, and makes it possible to bring the braided wire 12 to close contact with the shell 21 and reduce the electric resistance therebetween, as compared with a case in which the supporting member 40 does not exist. Similarly, the folded portion 13*a* of the drain wire 13 is also pressed against the inner face of the coupling portion 21*d* while being supported by the supporting member 40 and is brought into a state of being sandwiched between the supporting member 40 and the coupling portion 21*d*. With this process, the drain wire 13 is also electrically connected to the shell 21 through a relatively small electric resistance.

Here, the length of the supporting member 40 along the extension direction is longer than the length of the coupling portion 21 *d* along the same direction. Moreover, when the crimping process of the coupling portion 21 *d* is performed, the crimping process is performed in a state in which an adjustment has been made to cause the position of the end of the supporting member 40, which is at the cable-center side (that is, the side opposite the end side of the connector 20), to be located at a position nearer the cable-center side than the position of the end of the coupling portion 21 *d*. With this configuration, as illustrated in FIGS. 2 and 4, in a state in which the shell 21 is fixed to the cable body 10, the end of the supporting member 40, which is at the cable-center side, projects further than the coupling portion 21 *d* by a width d. Supposing that the crimping process is performed in a state in which the supporting member 40 is located at a further inside position than that of the coupling portion 21 *d*, a situation in which the supporting member 40 is shifted to an excessively further inside position and a position at which the crimping process is to be performed is misaligned with a position at which the supporting member 40 is present may occur. In such a situation, the ground connection wires cannot be sandwiched between the supporting member 40 and the coupling portion 21 *d* anymore. Thus, in the present embodiment, the way of performing the crimping process subsequent to making an adjustment to cause the end of the supporting member 40 to be located at a position nearer the cable-center side than the position of the coupling portion 21 *d* enables the supporting member 40 to certainly be present at the position at which the crimping process is to be performed. Further, performing the crimping process at such a position in a state in which the cover 24 does not exist causes the supporting member 40 to project from the coupling portion 21 *d* of the shell 21, and thus, after the completion of the crimping process, a confirmation that the position of the supporting member 40 is not misaligned can be made by means of a check with eyes or any other measurement method, thus making the management of the production process easy.

Note that any method capable of confirming that the position misalignment of the supporting member 40 is not occurring does not necessarily require that the supporting member 40 has a portion projecting relative to the coupling portion 21*d* in a side view. For example, a method of causing the individual cable-center side ends of the supporting member 40 and the coupling portion 21*d* to be disposed so as to be flush with each other or any other similar method may be employed to cause the cable-center side end of the supporting member 40 to have a portion exposed at the cable-center side opening of the rear portion 21*c*. Even such a configuration described above makes it possible to confirm that the position misalignment of the supporting member 40 is not occurring, by means of the check with eyes after the completion of the crimping process.

Moreover, in order to cause the braided wire 12 and the drain wire 13 to be electrically connected to the shell 21 through small electric resisters, the end portions of these ground connection wires may be soldered to the coupling portion 21 *d* of the shell 21. In the example of FIG. 4, a soldering portion 13 *b* resulting from projecting further from a portion sandwiched between the coupling portion 21 *d* and the supporting member 40 is formed at the end side of the folded portion 13 *a* of the drain wire 13. The soldering portion 13 *b* is disposed at the outer-face side of the coupling portion 21 *d* as a result of further outward folding of the end of the folded portion 13 *a*. Similarly, the end of the folded portion 12 *a* of the braided wire 12 is also further folded outward to form a soldering portion 12 *b*. The soldering portions 12 *b* and 13 *h* are soldered to the crimping-processed coupling portion 21 *d* by solder 41. Note that FIG. 2 illustrates a state before such soldering is performed. Further, in the above, a configuration in which the braided wire 12 and the drain wire 13 are both soldered has been described, but all of the ground connection wires may not be necessarily soldered, and, for example, only the drain wire 13 may be soldered.

In a state in which the above-described crimping process and soldering have been completed, the resin 21*e* is filled into the rear portion 21*c*. Further, the insertion portion 21*a* is led into the front portion 21*b* from the connector end side, and the front portion 21*b* is inserted so as to be fit into the rear portion 21*c*. With this process, the insertion portion 21*a*, the front portion 21*b*, and the rear portion 21*c* are joined, and the shell 21 is formed. Further, thereafter, the cover 24 is formed by filling resin in such a way that the resign material covers the whole of the coupling portion 21*d* and a portion constituting the supporting member 40 and projecting from the coupling portion 21*d*. Particularly, an end of the cover 24, which is at the cable-center side (that is, the side opposite the end side of the connector 20), is located at a position nearer the cable-center side than the cable-center side end of the supporting member 40. This configuration causes the cable-center side end face of the supporting member 40 to come into contact with a face of the cover 24, which is directed to the connector 20 side. The configuration, therefore, makes it possible to, when the cable body 10 is pulled toward the cable-center side relative to the cover 24, prevent the cable body 10 from being pulled away, by causing the end face of the supporting member 40 to be held by the cover 24.

Note that the production process for the signal cable 1 according to the present embodiment may be implemented in order different from the above-described order. Hereinafter, another example of the production process will be described. First, like the example having been described so far, in a state in which the end portion of the cable body 10 is led inside the supporting member 40 and inside the rear portion 21*c*, a process of exposing conductive wires of the end portions of the individual signal wires 14 is performed. Further, the insertion portion 21*a* of the shell 21 is attached to the housing 23, which houses the connection terminals 22, and then, the end portions of the individual signal wires 14 are soldered to the contact points disposed at the rear portion of the housing 23. Thereafter, in order different from that of the above-described example, the front portion 21*b* of the shell 21 is fit into the insertion portion 21*a*, and in first, the resin 21*e* is filled into the surrounding area of the soldering portions.

Thereafter, the alignment of the supporting member 40 is made. At this time, as described above, the supporting member 40 may be fixed to the cable body 10 by means of the crimping process or the like. Further, like the above-described example, the end portions of the individual braided wire 12 and drain wire 13 are folded to the outside of the supporting member 40 to form the folded portion 12*a* and the folded portion 13*a*. Thereafter, the rear portion 21*c* of the shell 21 is fit into the front portion 21*b* to dispose the coupling portion 21*d* at a position overlapping with the supporting member 40. Further, the coupling portion 21*d* is pressed against the supporting member 40 and the cable body 10 by means of the crimping process such as the swaging process to fix the rear portion 21*c* to the cable body 10. This process enables the individual braided wire 12 and drain wire 13 to be electrically connected to the shell 21.

Thereafter, the soldering portion 13*b* of the drain wire 13 and the soldering portion 12*b* of the braided wire 12 may be soldered to the coupling portion 21*d* as necessary. Moreover, thereafter, the cover 24 is formed by filling resin in such a way that the resign material covers the whole of the coupling portion 21*d* and the portion constituting the supporting member 40 and projecting from the coupling portion 21*d*. The above processes also enable the production of the signal cable 1 according to the present embodiment. Further, without being limited to the above-described example, the signal cable 1 according to the present embodiment may be produced according to other different procedures.

The above-described signal cable 1 according to the embodiment of the present invention enables the ground connection wires to be electrically connected to the shell 21 with certainty, by disposing the supporting member 40 and causing the supporting member 40 and the coupling portion 21*d* of the shell 21 to sandwich the ground connection wires inside the cable body 10 therebetween. This configuration enables reduction of the unnecessary electromagnetic radiation occurring from the portion where the cable body 10 and the connector 20 are coupled to each other.

Note that embodiments of the present invention are not limited to the above-described embodiment. For example, in the above description, an example in which the signal cable 1 is the HDMI cable has been taken, but without being limited to this example, the signal cable 1 may be any of various kinds of cables. Particularly, in a case where the present invention is applied to a cable, such as a universal serial bus (USB) cable, used for signal transmission/reception using a relatively high frequency clock, unnecessary electromagnetic radiation occurring in conjunction with such signal transmission/reception can be effectively reduced.

Figure 5:
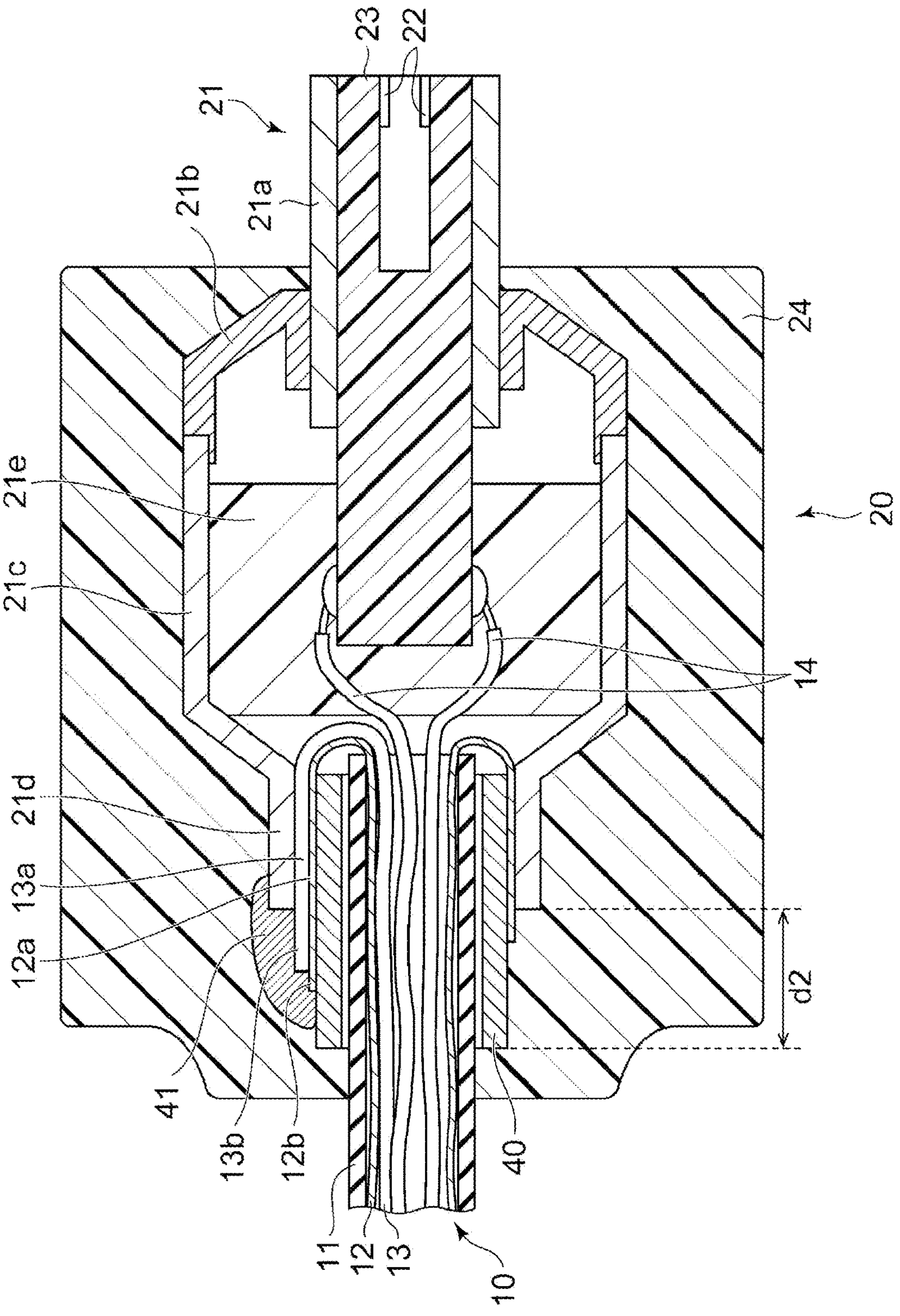
FIG. 5 is a cross-sectional view of a portion where a cable body and a connector are coupled to each other in a signal cable according to a modification example of the present invention.

Further, the shapes and the position relations with respect to the cable body 10, the connector 20, and the supporting member 40 in the above description are all just examples, and the cable body 10, the connector 20, and the supporting member 40 may have shapes and position relations different from those illustrated in the figures within the scope not departing from the gist of the present invention. For example, in the above description, a configuration in which, after the end portions of the ground connection wires have been folded to the cable-center side once so as to be disposed at the outer-face side of the supporting member 40, the end portions of the ground connection wires are further folded to the end side of connector 20 again so as to be disposed at the outer-face side of the coupling portion 21*d*, and the soldering portions disposed at the outer-face side of the coupling portion 21 are soldered to the coupling portion 21*d*, has been employed. Note, however, that, without being limited to the above configuration, the end portions of the ground connection wires may be formed as the soldering portions, in a state of being straightly extended without being folded to the outer-face side of the coupling portion 21*d*. FIG. 5 is a diagram illustrating a condition of the ground connection wires in a soldered state in the above case, and illustrates, just like FIG. 4, a condition of a cross-section of the portion where the cable body 10 and the connector 20 are coupled to each other, along the cable extension direction.

In the example of FIG. 5, a width d2 of a portion constituting the supporting member 40 and projecting from the coupling portion 21 *d* to the cable-center side is larger than the width d of FIG. 4. Further, the folded portion 12 *a* of the braided wire 12 and the folded portion 13 *a* of the drain wire 13 are both different from those of FIG. 4 and are not further folded. The folded portion 12 *a* and the folded portion 13 *a* have portions that project further, and extend, than the cable-center side end of the coupling portion 21 *d*. The tip portions of the individual braided wire 12 and drain wire 13, which project relative to the end of the coupling portion 21 *d*, function as the soldering portions 12 *b* and 13 *b*. That is, soldering is performed across from the outer face of the coupling portion 21 *d* to the outer face of the supporting member 40, and the solder 41 is formed so as to cover the soldering portion 12 *b* and the soldering portion 13 *b*. With this configuration, the tip portions of the braided wire 12 and the drain wire 13 are electrically connected to the shell 21 via the solder 41. Note that, like the case of FIG. 4, the configuration may be implemented such that the braided wire 12 does not have the portion that projects further than the cable-center side end of the coupling portion 21 *d*, and only the soldering portion 13 *b* of the end of the drain wire 13 is soldered to the shell 21.

Further, specific electric characteristics, cross-sectional area, and the like of a material that makes up the braided wire 12 may make it possible to, by using only the braided wire 12, sufficiently reduce the impedance between the connector 20 and the connector 30. In such a case, as the ground connection wires, only the braided wire 12 is sufficient, and the drain wire 13 may not be necessary. In this case, it follows that only the braided wire 12 is sandwiched between the supporting member 40 and the coupling portion 21*d* and is electrically connected to the shell 21. In contrast, the configuration may be implemented such that the ground connection wires include only the drain wire 13, and the braided wire 12 is not connected to the shell 21. Further, the ground connection wires may include a conductive wire having a different shape and being other than the braided wire 12 and the drain wire 13.

REFERENCE SIGNS LIST

1: Signal cable
10: Cable body
11: Covering portion
12: Braided wire
13: Drain wire
14: Signal wire
20: Connector
21: Shell
21*a*: Insertion portion
21*b*: Front portion
21*c*: Rear portion
21*d*: Coupling portion
21*e*: Resin
22: Connection terminal
23: Housing
24: Cover
30: Connector
40: Supporting member
41: Solder

The invention claimed is:

1. A signal cable device comprising:

a connector configured to be connected to an electronic device, the connector comprising a shell having a coupling portion, wherein the connector:

houses a connection terminal configured to be connected to a connection terminal included in the electronic device, and electrically connected to a frame ground of the electronic device in a state in which the connector s connected to the electronic device;

a cable body consisting of a tubular shape and including a covering portion and a ground connection wire within the covering portion, the ground connection wire being in contact with and electrically connected to the shell; and a supporting member having a tubular shape and having a higher rigidity than the covering portion, the supporting member having a first part that is inserted into the coupling portion of the shell and a second part that is not inserted into the coupling portion of the shell, wherein an end portion of the cable body, including the covering portion, is inserted inside the supporting member and extends further into the shell than the supporting member, wherein an end portion of the ground connection wire extends beyond an end of the covering portion and includes a first fold that redirects the around connection wire 180 degrees away from a centerline of the supporting member to produce a folded portion that rests on an outer surface of the supporting member, wherein the coupling portion of the shell is pressed onto each of the folded portion of the ground connection wire and the supporting member by a swaging process to form a shell coupling, portion cylinder having a smooth surface, and wherein the folded portion of the ground connection wire has a first portion that is located between the supporting member cylinder and the shell coupling portion cylinder, the first portion of the folded portion of the ground connection wire being followed by a terminal end of the ground connection wire that is located outside of the shell.

2. The signal cable device according to claim 1, further comprising:

a soldering portion located on each of:

an end of the shell coupling portion cylinder, the terminal end of the folded portion of the around connection wire, and the second part of the supporting member that is not inserted into the coupling portion of the shell.

3. The signal cable device according to claim 1, wherein the end portion of the ground connection wire includes a second fold after the first fold and before the terminal end, and wherein the second fold redirects the ground connection wire 180 degrees away from the centerline of the supporting member to produce a second folded portion that rests on an outer surface of the shell coupling portion cylinder.

4. The signal cable device according to claim 3, further comprising:

a soldering portion located on each of:

the outer surface of the shell coupling portion cylinder, and the terminal end of the folded portion of the ground connection wire.

5. The signal cable device according to claim 3, wherein the ground connection wire includes a drain wire that consists of a single conductive wire, and wherein the ground connection wire in contact with and electrically connected to the shell is a terminal end of the drain wire that is located after the second fold.

6. The signal cable device according to claim 5, wherein the ground connection wire further includes a braided wire formed by knitting a plurality of conductive wires so as to form a braided cylinder in the cable body, wherein a portion of the drain wire that is in the cable body is encompassed by the braided cylinder; and wherein a terminal end of the braided cylinder located after the second fold and outside of the coupling portion of the shell is formed into a braided collar.

7. The signal cable device according to claim 1, wherein the shell includes a plurality of members joined with each other, wherein the plurality of members in a state of being joined with each other has a tubular shape, and no opening is formed in an intermediate portion other than the end side of the connector and a portion fixed to the cable body.

8. The signal cable device according to claim 1, wherein the ground connection wire includes a drain wire that consists of a single conductive wire, and wherein the ground connection wire in contact with and electrically connected to the shell is a terminal end of the drain wire that is located after the first fold.

9. The signal cable device according to claim 8, wherein the ground connection wire further includes a braided wire formed by knitting a plurality of conductive wires so as to form a braided cylinder in the cable body, wherein a portion of the drain wire that is in the cable body is encompassed by the braided cylinder; and wherein a terminal end of the braided cylinder located after the first fold and outside of the coupling portion of the shell is formed into a braided collar.

* * * * *